UNITED STATES PATENT OFFICE.

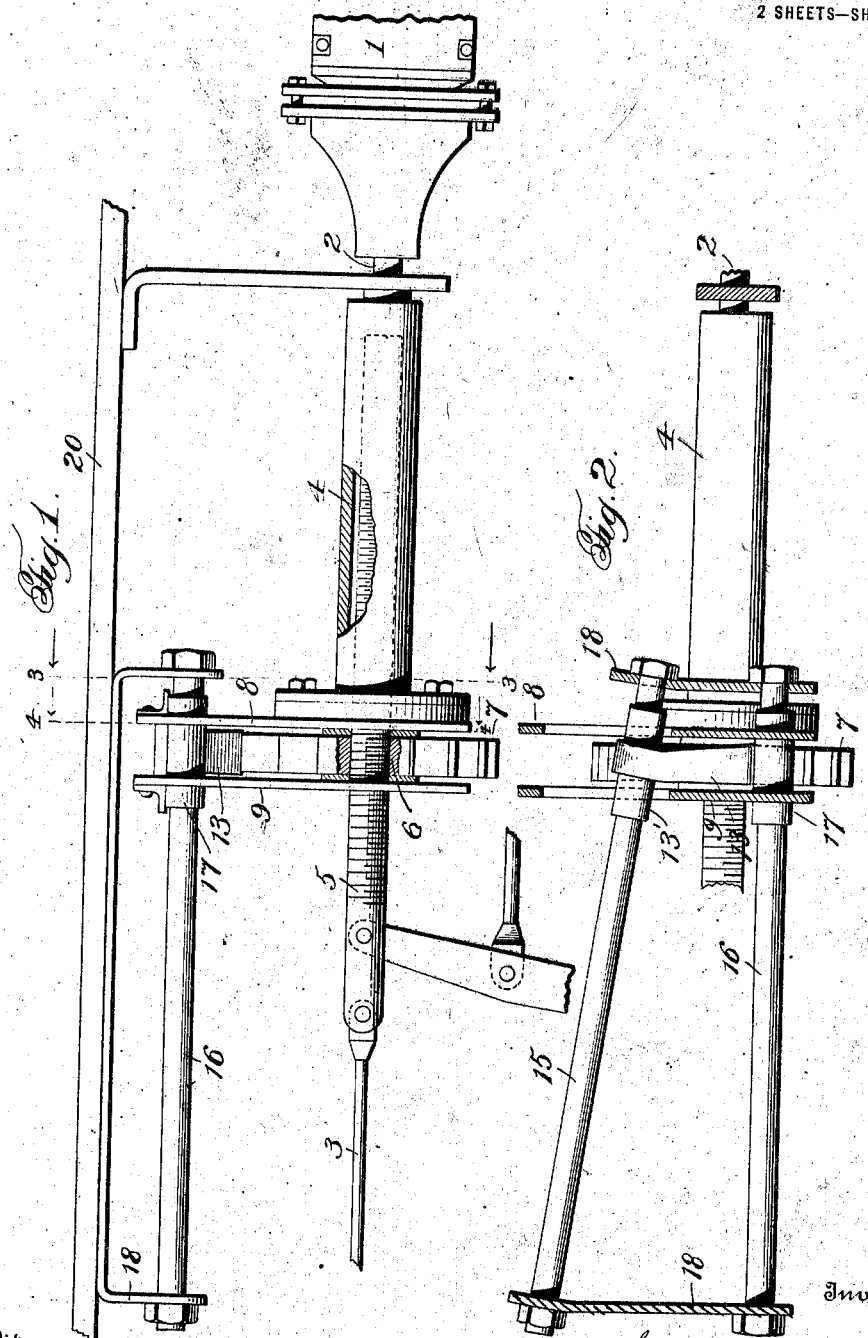

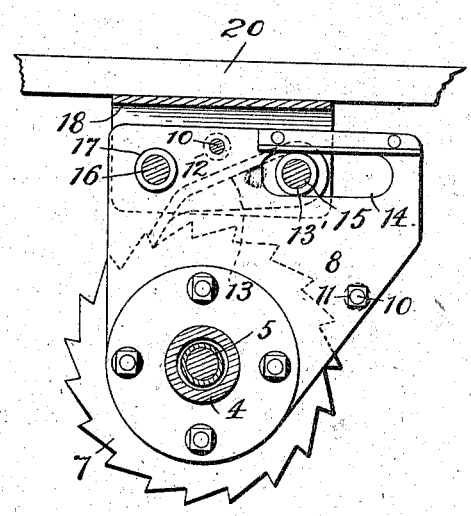
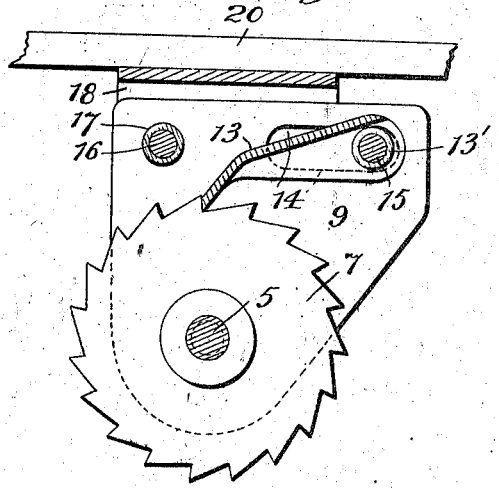

WILLIAM D. NEILS, OF DAVENPORT, IOWA.

AUTOMATIC SLACK-ADJUSTER.

1,291,086.   Specification of Letters Patent.   Patented Jan. 14, 1919.

Application filed July 11, 1918. Serial No. 244,347.

*To all whom it may concern:*

Be it known that I, WILLIAM D. NEILS, a citizen of the United States of America, residing at Davenport, in the county of Scott and State of Iowa, have invented certain new and useful Improvements in Automatic Slack-Adjusters, of which the following is a specification.

This invention relates to improvements in automatic slack adjusters for railway brakes, and has for its object to provide an improved device of this nature of simple construction that will not be liable to become disarranged but will be durable in use and will operate with sureness and efficiency to compensate for or take up the slack due to wear in the brake-shoes, stretching of the brake rigging, or other causes.

The invention, with other objects and advantages thereof and the particular construction, combination and arrangement of parts comprising the same will be understood from the hereinafter contained detail description when considered in connection with the accompanying drawings forming part hereof and illustrating one embodiment of the invention.

In the drawings:

Figure 1 is a side elevation of slack adjusting mechanism constructed in accordance with the present invention.

Fig. 2 is a top plan view of the slack adjusting mechanism, the supporting brackets being shown in section.

Fig. 3 is a transverse section on line 3—3 Fig. 1 looking in the direction of the arrow.

Fig. 4 is a transverse section on the line 4—4, Fig. 1, looking in the direction of the arrow.

In the drawings, I have illustrated by way of example a specific embodiment of the invention, but it will of course be understood that minor changes and variations in the particular construction shown, and the practising of the invention in other forms as will appeal to those skilled in the art and falling within the scope of the appended claims may be followed without departing from the principles of the invention.

The invention comprehends the use of an extensible push rod between the brake cylinder and piston and rigging composed of sections having an adjustable screw connection, a pawl and ratchet wheel for adjusting the screw connection and movable with the push rod, and a stationary cam for actuating the pawl and ratchet. An important characteristic of the present invention resides in the special construction of actuating cam and pawl, their special connection together, and the special support and guide provided for the pawl and ratchet whereby a simple practical structure is produced insuring smooth and easy operation, the structure being such as to prevent accidental disengagement of the pawl and cam, and to maintain at all times the intended proper working relation between these parts.

Referring to a detail description of the drawings, wherein like reference characters designate corresponding parts throughout the several views, 1 designates the brake cylinder, 2 the piston rod and 3 a part of the brake rigging, these parts being of well known construction and only indicated in a general way, the brake cylinder 1 being provided with the usual spring (not shown) for returning the parts to normal position after an operation of the brakes.

The push rod, which is shown interposed between the piston rod 2 and the part 3 consists of two sections 4—5 having an adjustable screw connection, the section 4 being tubular or in the form of a sleeve suitably secured at one end to the piston rod 2, and the section 5 being connected at one end with the part 3 of the rigging and telescoping within the tubular section 4. The section 5 is threaded and engages a threaded opening or nut part 6 of a ratchet wheel 7, the latter being supported in a frame or housing consisting of a pair of plates 8—9 secured together in spaced relation by screws and nuts 10—11 and spacing sleeves 12, the plate 8 of the housing being rigidly secured to the outer end of the tubular section 4 of the push rod. Supported in the frame or housing above the ratchet wheel 7 for coöperation therewith is a pawl 13, said pawl being provided at one end with a tubular bearing or sleeve 13′ projecting from opposite sides thereof and loosely engaging oppositely disposed elongated slots 14 in the housing plates 8—9. 15 is a stationary rod extending alongside and at an outward inclination from the forward part of the push rod, said rod extending through the slots 14 in the housing and through the tubular bearing 13′ of the pawl 13, the pawl being thus supported to slide longitudinally on the rod and having pivotal movement about the same.

16 designates a supporting rod for the frame or housing, the housing having a sliding engagement with the rod, which extends parallel with the push rod and through bearings 17 on the housing. The rods 15 and 17 may be supported in any desired manner. In the present instance, the rods are held in brackets or hangers 18, which are secured to the under framing 20 of the car.

As will be understood the frame or housing and pawl and ratchet are movable with the push rod, and upon movement of the push rod the pawl 13 sliding along the rod 15 will be shifted bodily laterally in a direction at right angles to the line of movement of the rod. The inclination of the rod 15 is such that in the normal stroke of the piston of the brake cylinder, the pawl 13 will not be given sufficient movement laterally to actuate the ratchet wheel, but when slack occurs in the system and the stroke of the brake piston is lengthened the pawl 13 on the forward stroke of the piston in the application of the brakes will be shifted laterally a sufficient distance so that upon the return movement of the brake piston and pawl, the pawl will turn the ratchet wheel to lengthen the push rod in accordance with the amount of slack to be taken up, the size of the teeth of the ratchet wheel, the pitch of the threads on the push bar section 5, and the inclination of the cam rod 15 being properly proportioned relatively to each other to effect this result.

It will be noted that by the particular construction and arrangement of parts hereinbefore described, a very simple practical structure is afforded. The special construction and engagement of the pawl and cam device with each other is such as to prevent accidental disengagement of these parts, and insuring the proper operation to effect the desired results.

What I claim is:

1. In an automatic slack adjuster, the combination of an extensible push rod comprising sections having a screw connection, and pawl and ratchet mechanism for adjusting the screw connection and the length of the push rod, said mechanism including a ratchet wheel and pawl movable with the push rod, and a stationary guide extending alongside the push rod at an inclination thereto, the pawl mounted upon the guide to slide longitudinally thereon and being movable bodily by said guide at right angles to the push rod to actuate the ratchet wheel.

2. In an automatic slack adjuster, the combination of an extensible push rod comprising sections having a screw connection, and pawl and ratchet mechanism for adjusting the screw connection and the length of the push rod, said mechanism including a ratchet wheel and pawl movable with the push rod, and a stationary guide rod extending alongside the push rod at an inclination thereto, said pawl being mounted upon the guide rod to slide longitudinally thereon and for pivotal movement, the pawl in its movement longitudinally of the rod being shifted laterally at right angles to the push rod to actuate the ratchet wheel.

3. In an automatic slack adjuster, the combination of an extensible push rod comprising sections having a screw connection, and pawl and ratchet mechanism for adjusting the screw connection and the length of the push rod, said mechanism including a housing secured to one section of the push rod and provided with an elongated slot, a ratchet wheel rotatably supported in the housing, a guide for the housing to support the same against movement laterally during its movement with the push rod, a stationary guide rod extending alongside of the push rod at an inclination thereto and through the slot in the housing, and a pawl rotatably supported on the guide rod within the housing and adapted to slide longitudinally on the guide rod, said pawl being shifted laterally at right angles to the push rod in its movement along the guide rod to actuate the ratchet wheel.

4. In an automatic slack adjuster, the combination of an extensible push rod comprising sections having a screw connection, and pawl and ratchet mechanism for adjusting the screw connection and the length of the push road, said mechanism including a frame secured to one section of the push rod and provided with an elongated opening, a ratchet wheel supported in the frame, a stationary guide rod for the housing to maintain the same against movement laterally, said guide rod extending parallel with the push rod and through a bearing on said frame, a stationary guide rod extending alongside of the push rod at an inclination thereto and through the opening in the frame, and a pawl rotatably supported on the guide rod within the frame and adapted to slide longitudinally on said guide rod, said pawl being shifted laterally at right angles to the push rod in its movement along the guide rod to actuate the ratchet wheel.

5. In an automatic slack adjuster, the combination of an extensible push rod comprising sections having a screw connection, and pawl and ratchet mechanism for adjusting the screw connection and the length of the push rod, said mechanism including a housing secured to one section of the push rod and comprising a pair of plates secured together in spaced relation, said plates having alined slots, a ratchet wheel arranged between the plates of the housing, a guide for the housing against lateral movement, a stationary guide rod extending alongside of the push rod at an inclination thereto and through the slots in the housing plates, and a pawl rotatably supported on said guide rod between the plates of the housing and adapted to slide longitudinally on the guide rod, the pawl being shiftable laterally at right angles to the push rod in its movement along the guide rod to actuate the ratchet wheel.

6. In an automatic slack adjuster, the combination of an extensible push rod comprising sections having a screw connection, and pawl and ratchet mechanism for adjusting the screw connection and the length of the push rod, said mechanism including a ratchet wheel and a pawl movable with the push rod, and a stationary guide extending alongside the push rod at an inclination thereto, the pawl mounted upon the guide to slide longitudinally thereon and for pivotal movement, and said pawl being movable bodily by said guide at right angles to the push rod to actuate the ratchet wheel.

In testimony whereof I affix my signature in the presence of two witnesses.

WILLIAM D. NEILS.

Witnesses:
E. L. BLEAN,
G. E. LAU.